UNITED STATES PATENT OFFICE.

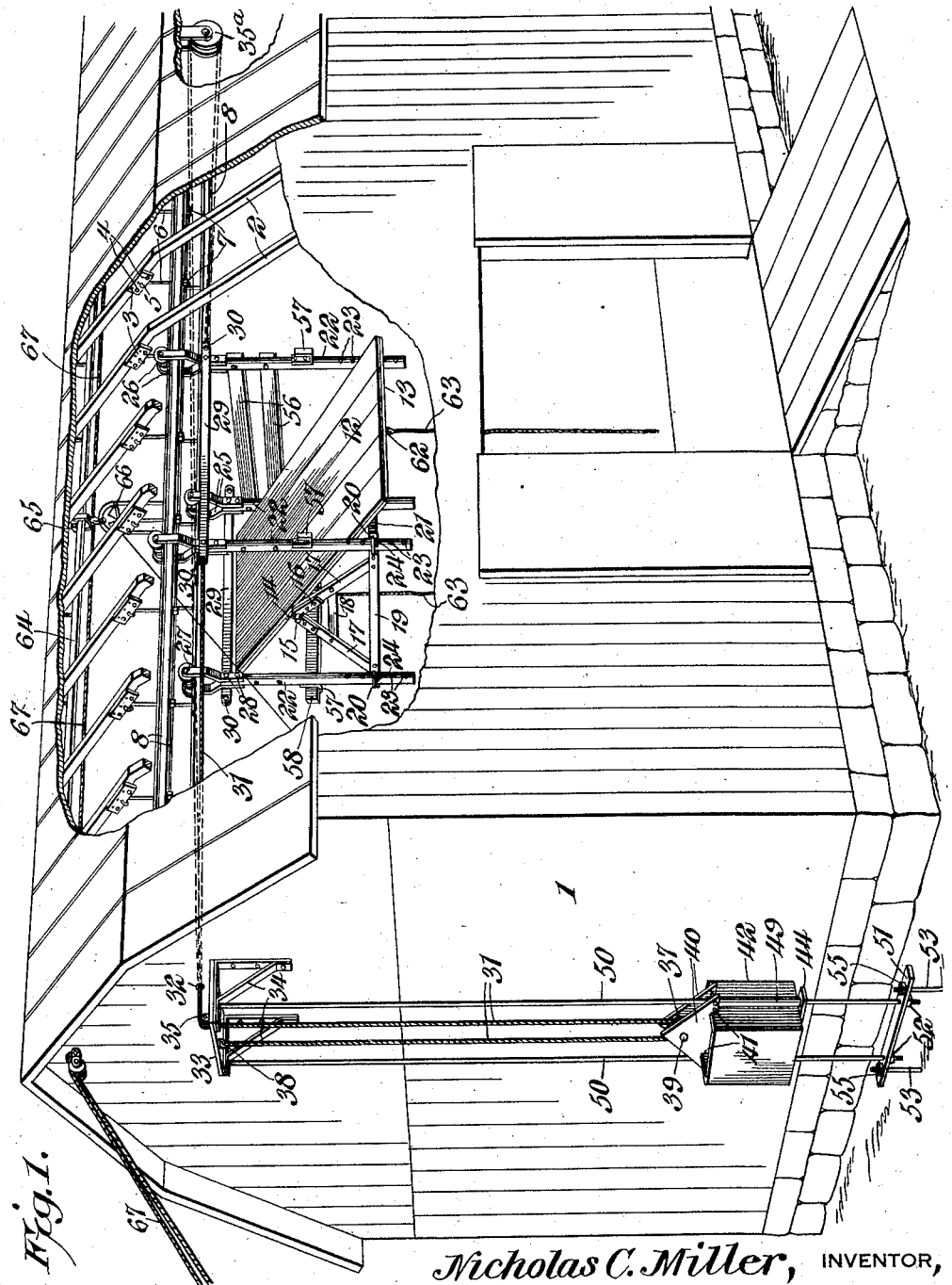

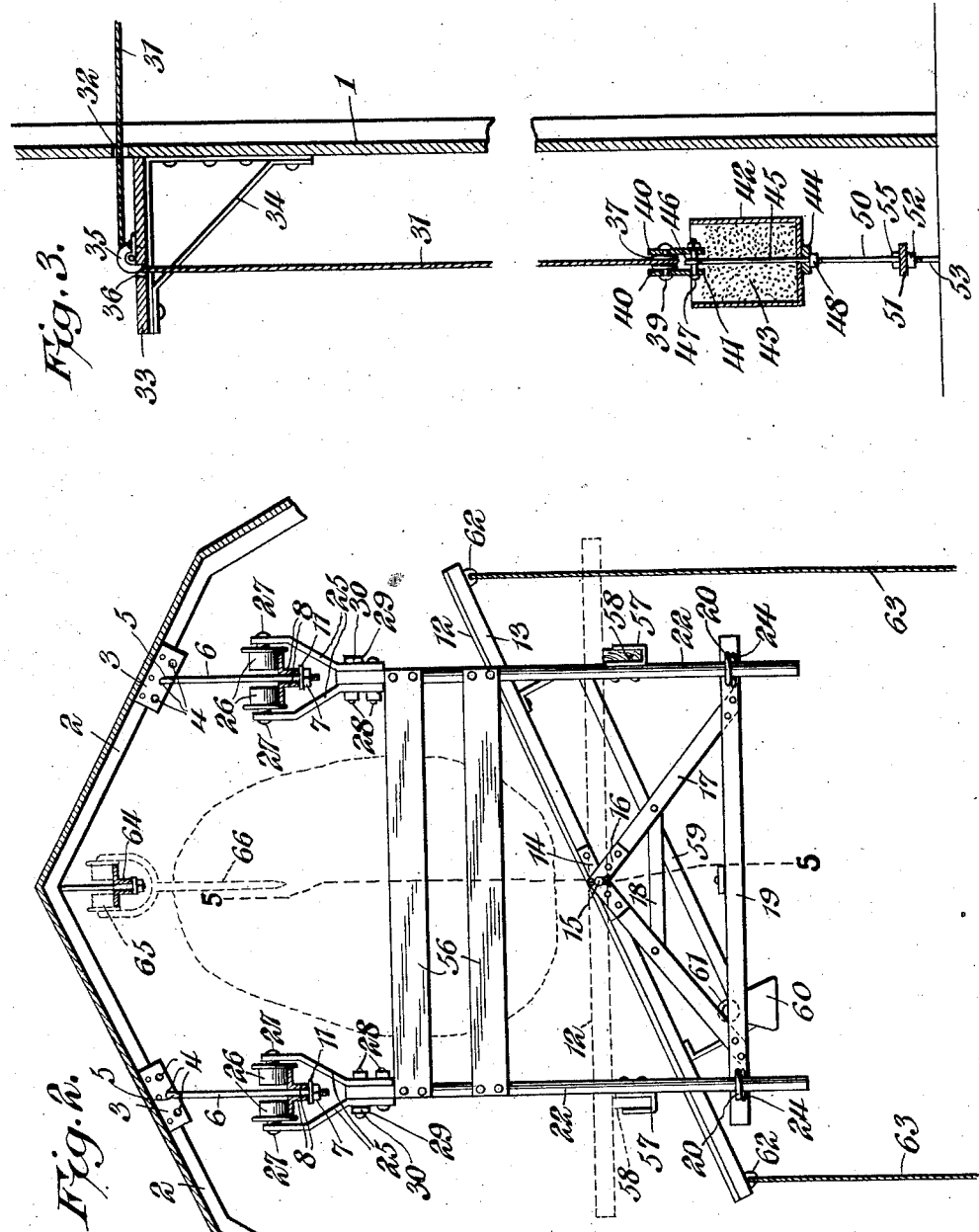

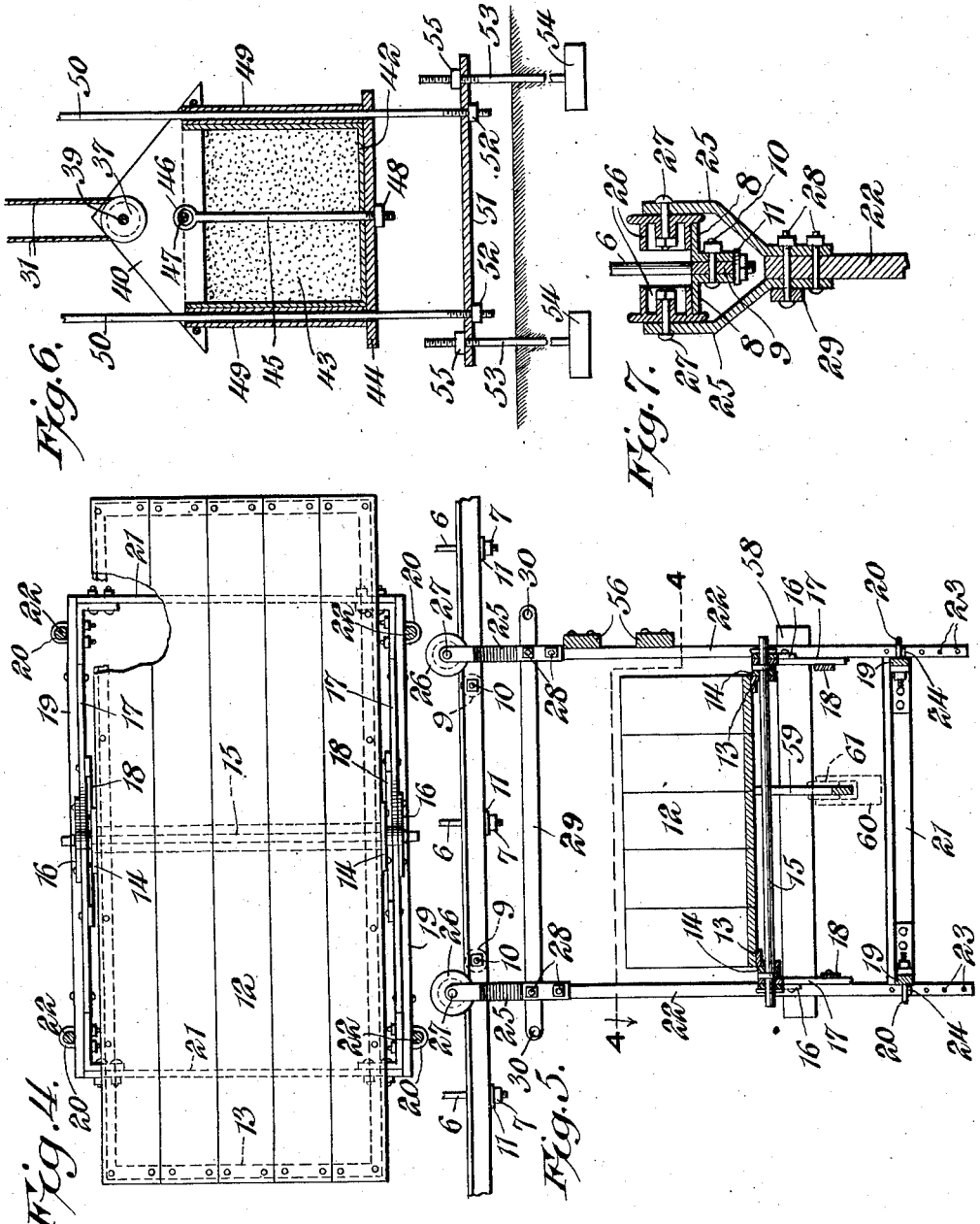

NICHOLAS C. MILLER, OF DODGEVILLE, WISCONSIN.

HAY-DISTRIBUTER.

1,025,708.　　　　　Specification of Letters Patent.　　Patented May 7, 1912.

Application filed December 21, 1910. Serial No. 598,652.

*To all whom it may concern:*

Be it known that I, NICHOLAS C. MILLER, a citizen of the United States, residing at Dodgeville, in the county of Iowa and State of Wisconsin, have invented a new and useful Hay-Distributer, of which the following is a specification.

This invention has reference to improvements in apparatus for distributing hay within barns or other buildings, and its object is to provide a device of this character wherein the distributer is so mounted as to not interfere with the building up of the hay mows to any desired height.

In accordance with the present invention the distributer is pendently mounted upon tracks, which in turn are hung from the rafters of the building in which the device is installed, and provision is made whereby the track may be properly leveled even though the supporting devices are not accurately placed within the building, and, furthermore, provision is made for elevating or lowering the support for the distributer to accommodate the same to different conditions. Provision is, also, made for constraining the distributer toward one end of the building, so that it may be readily tilted to one side or the other as needed by the man on the load of hay, the action of the constraining means being to move the distributer into such relation to the load of hay that the manipulating ropes usually provided are readily grasped by the man on the load.

The invention will be best understood from a consideration of the following detailed description, taken in connection with the accompanying drawings, forming a part of this specification, with the understanding, however, that while the showing of the drawings is that of a practical form of the invention, the structure is capable of other embodiments and, therefore, the invention is not limited to the exact details of structure or arrangement of parts illustrated.

In the drawings:—Figure 1 is a perspective view of a portion of a barn with the invention installed therein, parts being broken away and shown in section. Fig. 2 is a cross section of the roof of the barn of Fig. 1, showing the distributer mechanism in elevation. Fig. 3 is a vertical section through one wall of the barn and of the constraining weight and associated parts. Fig. 4 is a section on the line 4—4 of Fig. 5. Fig. 5 is a section on the line 5—5 of Fig. 2. Fig. 6 is a central section of the counter-weight and associated parts shown in Fig. 3 but taken in a plane at right angles to the plane of the section of Fig. 3. Fig. 7 is a section of one of the tracks and one of the trolley hangers drawn to a larger scale than the other figures.

Referring to the drawings, there is shown a barn 1 which may be taken as typical of any barn or other storage structure for receiving hay or straw or like material, and the roof of the barn is shown as supported upon rafters 2, but the type of housing structure does not enter into the present invention, and, therefore, the showing of the drawings with respect to the barn structure may be taken as indicative of any suitable structure for the purpose.

Secured to the rafters 2 on opposite sides of the ridge of the roof are plates 3, in each of which there is formed a series of holes 4, any one of which may receive the hook end 5 of a hanger rod 6, which has the end remote from the hook 5 threaded to receive a nut 7. The hanger bolts 6 are designed to support a track made up of two angle strips 8 arranged with their like webs adjacent, but spaced by blocks 9 and held together by bolts 10, while the hanger rods 6 extend through the space between the adjacent but separated webs of the track strips 8 with the threaded end of each rod below the track strip, and these rods serve to support the tracks by means of the nuts 7 and interposed washers 11. The other webs of the track strips 8 are arranged to lie in the same plane and project oppositely from the hanger rods to constitute the treads of the tracks.

By reason of the plates 3, which when secured to the rafters 2 take substantially the same inclination as the rafters and the series of holes 4 are likewise inclined, the tracks 8 may be arranged at different heights above the floor of the barn as may be found convenient, and the tracks may be readily leveled by means of the nuts 7 irrespective of want of conformity in the attachment of the plates 3 to the rafters 2. The tracks 8 extend lengthwise of the roof in comparatively close relation to the peak or ridge thereof.

The deflector structure comprises a platform 12 which may be formed of a rectangular frame 13 of angle metal to which are attached boards, or this platform may be otherwise formed. At the opposite sides midway of the length of the platform there are secured brackets 14 each provided with a pin or stud 15 designed to constitute a pivot stud for the platform 12. Each pin 15 projects through a perforation in an angle plate 16 secured to the angle of a truss made of side members 17 and an intermediate connecting member 18, while the legs of the truss are at their ends made fast to a bar 19 carrying at the extremities staples 20, and the corresponding ends of the bars 19 are joined by connecting bars 21, so that the bars 19 and 21 together form a substantial frame. The staples 20 encircle hanger rods 22, there being four of such rods and each rod 22 has a longitudinal series of perforations 23. The frame made up of the members 17, 18, 19, 20 and 21, which may be called the deflector supporting frame, is carried by the rods 22 through the intermediary of pins 24 traversing appropriate ones of the perforations 23, the pins 24 being preferably of the type known as cotter pins, although not of necessity confined to such type of pins. The staples 20 are threaded at the ends for nuts, so that when adjustments have been made the nuts may be tightened and the entire frame made rigid.

To the upper end of each rod 22 there is secured a yoke made up of two divergent members 25, each carrying at the end remote from the rod 22 a flanged roller 26 mounted on a journal pin 27, which in the particular structure shown in the drawings may be in the form of a bolt. The rollers 26 ride upon the outwardly directed flanges of the track 8 on opposite sides of the central portion of the same as defined by the hangers 6, the flanges of the rollers preventing the latter from moving laterally of the track to engage the hanger rods 6 or to escape from the track by running off the same. The yoke members 25 are made fast to the rods 22 by bolts 28 and the rods 22 supported from the same track are joined by a coupling bar 29, which may be secured to the respective bars 22 by one of the bolts 28 serving to connect the yoke members 25 of the same bar. The bars 29 are longer than the distance between the respective rods 22 and beyond these rods each bar is formed with an eye 30 for the attachment of a rope 31, although usually but one rope 31 is employed, but since the structure is designed to be used under different conditions and in different housings without the necessity of making changes therein, the connecting bars 29 may each be provided with an eye 30 at each end.

The rope 31 is carried through a passage 32 in one end wall of the barn or housing, and adjacent this passage 32 there is secured a platform 33, by means of brackets 34. The platform 33 has mounted thereon a roller 35 preferably in adjustable relation to a passage 36 in the platform, so that the rope 31 after being carried through the passage 32 may be carried over the roller 35 and thence through the passage 36, the said rope being then directed downwardly around another roller 37, to which reference will presently be made, thence upward, and is finally fastened at the end remote from the bar 29 to which it is secured, to an eye 38 on the under side of the platform 33. At the other end of the barn there is a roller 35ª, so that instead of fastening the rope 31 to the end of a bar 29 toward the roller 35, it may be fastened to the other end of the bar, and carried around the roller 35ª and from thence to the roller 35.

The roller 37 is mounted on a pin 39 secured between two plates 40 in spaced parallel relation, these plates being preferably of triangular form and are seated in notches 41 in the upper end walls of a box 42 designed to carry sand or other suitable heavy material indicated at 43. The box rests upon a plate or strip 44 which is traversed by a rod 45 extending upward through the box and into the space between the plates 40, where it may be formed into an eye 46 traversed by a pin 47 in turn made fast in the plates 40, while beneath the strip 44 the rod 45 has applied thereto a nut 48, the rod being appropriately threaded, so that the plates 40 may be bound tightly to the box. On opposite sides of the box 42 are tubular guides 49 fast thereto, and the strip 44 may be provided with passages alined with the tubular guides, which latter may also extend between the plates 40. These tubular guides are traversed by rods 50 in spaced relation one to the other and made fast at their upper ends to the brackets 34, while at their lower ends they traverse a straining strip 51, the said rods being threaded where passed through the strip 51 and there receiving nuts 52. The strip 51 is also traversed by anchor rods 53 suitably buried in the ground and provided with anchor plates or blocks 54, while the upper ends of these rods 53 where traversing the straining strip 51 are suitably threaded for the reception of nuts 55. By a proper manipulation of the nuts 55 the rods 50 may be put under such tension as is desirable and these rods serve as guides for the box 42, which when supplied with a suitable quantity of material 43 serves as an impelling weight for the deflector structure, tending to move the same either toward or from that end of the barn where the weight is located depending upon the disposition of the rope 31.

The bars 22 at one end of the deflector structure, considering the direction of movement of the said structure on the tracks, are connected together by strips 56 for a purpose which will presently appear. All the bars 22 carry hook-like brackets 57 in position to receive bars 58, one of which is shown in Figs. 1, 2 and 5, but two such bars may be used, the second bar being indicated in dotted lines at the left hand side of Fig. 2. The purpose of the bars 58 is to support the platform 12 when in an intermediate position, so that a workman may stand thereon to inspect or repair parts above the platform. When the structure is in use for the distribution of material, these bars are removed, so as not to interfere with tilting of the platform 12 about the pivot supports 15.

On the under side of the platform 12 there is provided a track 59 upon which is mounted a weight 60 by means of a roller 61, the tendency of the weight being to move to one end or the other of the track as the platform 12 is tilted, and by this weight maintain the platform in the tilted position. To the under side of the platform at opposite ends thereof are eyes 62 to each of which is secured one end of a rope 63 designed to hang and of sufficient length to be readily reached by an attendant standing on a load of hay, so that the platform 12 may be tilted in one direction or the other, as desired, without necessity of the attendant leaving the load of hay.

Secured to the roof of the barn beneath the peak thereof, is a track 64, which may be similar to the tracks 8, and upon this track there is mounted a trolley 65 similar to the trolley supports of the bars 22, this trolley carrying a fork 66, which is merely indicated in the drawings without any attempt to show the structure thereof, since the fork may be an ordinary hay fork. The trolley 65 with the fork 66 is under the control of a rope 67 whereby the fork may be moved lengthwise of the barn and permitted to drop into engaging relation to the load of hay to be distributed, and be then elevated and carried to the point of disposal.

The action of the weight box 42 is to cause a movement of the distributer into a position above the load of hay, where the ropes 63 are within ready reach of an attendant on said load of hay, but the position of the deflector is at this time such as to not interfere with the proper operation of the hay fork.

When a fork full of hay has been elevated, it is moved toward the part of the barn where it is desirable the hay should be deposited. In the movement of the fork full of hay, it is brought into engagement with the strips 56 and then the deflector structure participates in the further movement of the fork full of hay until the point of disposition of the hay has been reached. Now, the hay may be released from the fork and will gravitate along the deflector platform 12, which is tilted toward the side of the barn where it is desired the fork full of hay should be directed, and the hay will fall from the platform into the desired portion of the barn. As soon as the deflector is relieved of the load of hay, it will travel back to the position over the load of hay because of the action of the weight box 42, and then if it be desirable that the next fork full of hay should be deposited on the side of the barn remote from that toward which the first fork full of hay was directed, the attendant pulls the appropriate rope 63 and the platform is tilted in the opposite direction, being there held by the weight 60 which travels along the track 59 to the other end thereof on the designed tilting of the platform. When the next fork full of hay is elevated and carried toward the point of disposal, the same operation as before is carried out, except that the second fork full of hay is delivered toward the side of the barn remote from that first considered.

When hay is to be deposited at that end of the barn from the one just considered the rope 31 is changed being connected to the other end of the deflector structure and the strips 56 are likewise changed, when the operation described may be carried out, except that the direction of travel through the barn is reversed.

What is claimed is:—

1. In an apparatus for the purpose described, a suitable track, a carrier mounted thereon for movement therealong, a tiltable platform on the carrier, a flexible strand connected to the carrier, a weight connected to the flexible strand and tending to move the carrier toward either limit of it travel, guides for the weight, and adjustable means for the guides for maintaining them in a taut condition.

2. In an apparatus for the purpose described, a suitable housing, a track mounted therein, a carrier movable along the track, a tiltable platform on the carrier, a flexible strand connected to the carrier, a weight connected to the strand and comprising a box having spaced plates at one end, a cross piece at the other end, a connecting rod between the plates and the cross piece for clamping the members together, and a pulley between the plates, the flexible strand being passed around said pulley, a support secured to the housing and receiving the end of the strand remote from the carrier, a direction changing pulley on the support, guide rods each fast at one end to the support, and a tension producing anchorage for the other ends of the guide rods, the box being provided with guides traversed by the said guide rods.

3. In an apparatus for the purpose described, a track, a tiltable platform, and a carrier therefor in pendent relation to the track, the tiltable platform being supported by the carrier in adjustable relation thereto for movement toward and from the track.

4. In an apparatus for the purpose described, a track, a carrier movable along the track, and in pendent relation thereto and including a member adjustable to and from the track, and a platform mounted on the adjustable member and tiltable thereon about an axis intermediate of the platform.

5. In an apparatus for the purpose described, a suitable track, a carrier comprising a plurality of rods each provided with a trolley support adapted to the track and from which the rod depends, a frame connecting the ends of the rods remote from the trolleys and wholly supported by said rods, and a tiltable platform mounted on said frame.

6. In an apparatus for the purpose described, a suitable track, bars each provided at one end with a trolley adapted to the track, said bars having connecting members joining them in pairs, a frame connecting the pairs of bars together, and a platform pivotally mounted on the frame and tiltable on its pivot supports.

7. In an apparatus for the purpose described, a track composed of two spaced rails, a carrier comprising two pairs of bars each provided with a trolley support movable along the respective track with the bars pendent, a frame connecting the ends of the bars remote from the trolley supports, and a platform on said frame and pivoted thereto intermediate of the length of the platform.

8. In an apparatus for the purpose described, a track composed of two spaced rails, a carrier comprising two pairs of bars each provided with a trolley support movable along the respective track with the bars pendent, a frame connecting the ends of the bars remote from the trolley supports, and a platform on said frame and pivoted thereto intermediate of the length of the platform, the connecting frame carrying the platform being adjustable lengthwise of the bars carrying it.

9. In an apparatus for the purpose described, a suitable housing, elevated tracks therein each formed of angle strips with like webs adjacent and the other webs projecting oppositely one from the other and constituting the tread of the track, hangers for the track each being adjustable relative to the track, supports for the hangers fast to the housing, a carrier mounted on the track for travel therealong in pendent relation to the track, and a tiltable platform mounted on the carrier.

10. In an apparatus for the purpose described, a suitable housing, an elevated track therein composed of joined angle strips with adjacent webs in spaced relation, hanger rods extending between the adjacent webs and provided at the ends beneath the webs with nuts for upholding the tracks, perforated plates constituting supports for the hanger rods, a carrier provided with rollers in embracing relation to the respective track rails and in pendent relation to said tracks, and a tiltable platform mounted on the carrier beneath the tracks.

11. In an apparatus for the purpose described, suitable tracks, a tiltable platform, and a carrier therefor mounted on the tracks in pendent relation thereto, said carrier comprising a frame to which the platform is pivotally connected at an intermediate point of the platform, said frame having staples at the corners, rods each traversing a respective eye in a respective corner of the frame and each provided at the end remote from that traversing the staples with a yoke in embracing relation to a respective track rail and having flanged rollers mounted thereon adapted to embrace a respective track, and connecting bars for the roller ends of the rods.

12. In an apparatus for the purpose described, suitable tracks, a tiltable platform, and a carrier therefor mounted on the tracks in pendent relation thereto, said carrier comprising a frame to which the platform is pivotally connected at an intermediate point of the platform, said frame having staples at the corners, rods each traversing a respective staple in a respective corner of the frame and each provided at the end remote from that traversing the eye with a yoke in embracing relation to a respective track rail and having flanged rollers mounted thereon adapted to embrace a respective track, and connecting bars for the roller ends of the rods, the pendent rods being each provided with a series of perforations where traversing the staples of the frame for permitting the securing of the frame to the rods in adjustable relation thereto.

13. In an apparatus for the purpose described, suitable tracks, a tiltable platform, and a carrier therefor mounted on the tracks in pendent relation thereto, said carrier comprising a frame to which the platform is pivotally connected at an intermediate point of the platform, said frame having staples at the corners, rods each traversing a respective staple in a respective corner of the frame and each provided at the end remote from that traversing the staple with a yoke in embracing relation to a respective track rail and having flanged rollers mounted thereon adapted to embrace a respective track, and connecting bars for the roller ends of the rods, each pendent rod being provided with a hook socket for the reception of a platform engaging bar to lock the platform in an inactive position.

14. In an apparatus for the purpose described, a suitable track, a tiltable platform, and a support for the platform comprising a frame having journal bearings and also having staples at the corners of the frame, pivot members on the platform intermediate thereof and adapted to said journal bearings, bars each at one end traversing a respective staple in the frame and there formed with a series of perforations for the reception of fastening means for the frame, each bar being formed with a hook shaped bracket and at the end remote from the perforated end being formed with a yoke having divergent members each provided with a flanged roller adapted to a respective track and from which its bar is pendently supported, connecting bars for the pairs of pendent bars, and strips connected at the ends to like bars of the pairs of bars.

In testimony, that I claim the foregoing as my own, I have hereto affixed my signature in the presence of two witnesses.

NICHOLAS C. MILLER.

Witnesses:
 D. H. WILLIAMS,
 V. T. WILLIAMS.

Copies of this patent may be obtained for five cents each, by addressing the "Commissioner of Patents, Washington, D. C."